US007808681B2

(12) United States Patent
Hatzav et al.

(10) Patent No.: US 7,808,681 B2
(45) Date of Patent: Oct. 5, 2010

(54) PORTABLE PHOTOCOPY APPARATUS AND METHOD OF USE

(76) Inventors: Iuval Hatzav, 10350 Santa Monica Blvd. Suite 310, Los Angeles, CA (US) 90025; Ilan Ben-Shahar, 2 Shderot Yerushalaim street, Beer-Sheva (IL) 84771; Giyora Sharaby, 11 Hagefen street, Moshav Neve Yarak (IL) 49945; Daniel Hatzav, 3 Tavass street, Hod Hasharon (IL) 45353

( * ) Notice: Subject to any disclaimer, the term of this patent is extended or adjusted under 35 U.S.C. 154(b) by 903 days.

(21) Appl. No.: 11/552,321

(22) Filed: Oct. 24, 2006

(65) Prior Publication Data

US 2007/0048012 A1 Mar. 1, 2007

(51) Int. Cl.
*H04N 1/04* (2006.01)

(52) U.S. Cl. ........................ 358/474; 358/483; 358/906; 358/909.1; 348/206.1; 382/284; 382/229

(58) Field of Classification Search ................. 358/474, 358/475, 483, 513, 514, 473, 906, 909.1; 348/206.1, 207.99, 211.14; 382/284, 159, 382/190, 229, 312

See application file for complete search history.

(56) References Cited

U.S. PATENT DOCUMENTS

| | | | | |
|---|---|---|---|---|
| 4,375,916 | A * | 3/1983 | Levine | 358/401 |
| 5,572,251 | A * | 11/1996 | Ogawa | 348/207.99 |
| 5,585,926 | A * | 12/1996 | Fujii et al. | 358/471 |
| 7,508,424 | B2 * | 3/2009 | Hayashi | 348/231.2 |
| 7,551,328 | B2 * | 6/2009 | Kondo et al. | 358/474 |
| 7,561,183 | B1 * | 7/2009 | Schaffner | 348/207.99 |
| 2004/0027620 | A1 * | 2/2004 | Tseng | 358/474 |
| 2006/0158522 | A1 * | 7/2006 | Pryor | 348/207.99 |
| 2007/0048012 | A1 * | 3/2007 | Hatzav et al. | 399/130 |
| 2008/0118099 | A1 * | 5/2008 | Alattar et al. | 382/100 |

* cited by examiner

*Primary Examiner*—Negussie Worku

(57) ABSTRACT

An apparatus and methods for copying documents, especially to a personal, portable and foldable document copier that can identify the presence of a new document such as a book, a page, a business card, an ID card, a passport and the like documents, adapt to its size, automatically synchronize with text line orientation if present, take an image and transfer it to a coupled computer.

17 Claims, 4 Drawing Sheets

PORTABLE PHOTOCOPY APPARATUS AND METHOD OF USE

CROSS-REFERENCE TO RELATED APPLICATIONS

This application is related to application Ser. No. 10/959,261, filed Oct. 6, 2004, which is incorporated by reference for all purposes as if fully set forth herein.

FIELD OF THE INVENTION

The present invention relates to apparatus and methods for copying documents, especially to a personal document copier that can identify the presence of a new document such as a book, a page, a business card, an ID card, a passport and the like documents, adapt to its size, automatically synchronize with text line orientation if present, take an image and transfer it to a coupled computer.

BACKGROUND OF THE INVENTION

There are numerous document copiers in the market place. They can copy documents of various sizes, but most of them need to scan the full document and often scan the full preset maximum document size. They comprise a CCD array to the full width of the scanner and the CCD, along with fluorescent light source, scans the full length of the scanner bed or the full document moves underneath the CCD array. Such copiers involve many mechanical elements that provide accurate motion and synchronization.

Other copiers use hand held scanners that work basically the same accept that the reader part is being held and is moved by the user over the document.

Photocopiers that image the whole document with a single frame or a sequence of frames, such that no motion of either the camera or document is required, are hard to be found. The field of view of an ordinary camera requires it to be at a far distance from the document to be copied. To cover, for example, an A4 form requires the placing the camera 20-30 cm from it, depending on the optical characteristics of the camera.

U.S. Pat. No. 4,375,916, issued to Levine, has attempted to provide a portable detachable photocopier that was limited in the frame size.

Today, low cost cameras with wide field of view enable to provide a portable, adjustable and foldable photocopier as is described in the present invention.

SUMMARY OF THE INVENTION

In view of the limitations now presented in the prior art, the present invention provides a new and useful system that can enhance the quality of the copied document and the endurance of the apparatus.

The object of the present invention is then to provide a personal, portable, adjustable and foldable document copier that can identify the presence of a new document such as a book, a page, a business card, an ID card, a passport and the like documents, adapt to its size, automatically synchronize with text line orientation—if present, take an image and transfer it to a coupled computer.

In one embodiment the system comprises a foldable structure housing a digital camera equipped with a lens and at least one light source. Optionally, the light source is equipped with light diffuser to provide even illumination of the document. Optionally said diffuser is a light reflector. Optionally, light baffle prevents direct light reaching the document from the light source. Even illumination of the document can also be provided by means other than a light diffuser.

Acquiring data may be initiated by the user or may be initiated automatically when the system senses that a new document was placed. Sensing the placement of a new document may be done with a sensor within the system or by acquiring images at regular intervals and performing at least partial image analysis to identify placement of a document. Preferably, images taken for this purpose are at lower image quality than images taken for the purpose of information extraction.

Optionally, the system is equipped with a status display means, preferably an indicator light to inform the user when the system is ready for the next document etc.

The system is controlled by a processor. Optionally, the processor is connected to the system using a communication link such as USB. Optionally, the processor is linked to external preferably official database for optional storing, verifying or distributing the extracted data.

Extraction of textual data from a document, such as an identity document, is optionally assisted by prior knowledge of the type of document and a template stored within the processor or the remote database. Preferably, information extraction is done in stages: First, boundaries between text and background are determined based on minimum contrast between the character and other colored data on the card. Second, black and white glyphs are extracted using the data of boundaries. Third, OCR recognizes symbols and characters.

Several types of images may be acquired by the system:

a) Gray level or color image (Red, Green Blue) may be acquired by white light illumination and conventional color two-dimensional sensor array.

b) Infrared (IR) reflection image may be acquired by IR illumination and using the red sensitive part of the sensor array. Ultra violet (UV) reflectance image of the document may be acquired by illuminating the document with UV light and acquiring data from the blue sensitive pixels of a color sensitive sensor array.

c) Florescence image of the document may be acquired by illuminating the document with excitation light in UV or blue wavelength and acquiring data from the green and red sensitive pixels of a color sensitive sensor array.

In contrast to systems based on linear optical scanner, the current invention may acquire data more rapidly a two dimensional copy of the document. The inventive system may be designed with a limited number or no moving parts and thus, is more reliable than mechanically scanning systems.

Even illumination of the card, high resolution imaging, preprocessing of the image and prior knowledge of the template of the document, each contributes to higher accuracy of the extracted data.

Multi-spectral imaging enables locating authentication marks on the document, which are difficult to observe visually, or that are printed using invisible ink.

It is an object of the present invention to provide a system for extracting information from a document 1, a business card, a driver's license, a passport and the like documents that are accurate and less error-prone.

These and other advantages of the present invention will become apparent upon reading the following detailed descriptions and studying the various figures of the drawings.

BRIEF DESCRIPTION OF THE DRAWINGS

The present invention will become fully understood from the detailed description given herein below and the accompanying drawings, which are generally not drawn to scale and are given by way of illustration only and thus, not limitative of the present invention, and wherein.

DETAILED DESCRIPTION OF THE INVENTION

Figure 1:
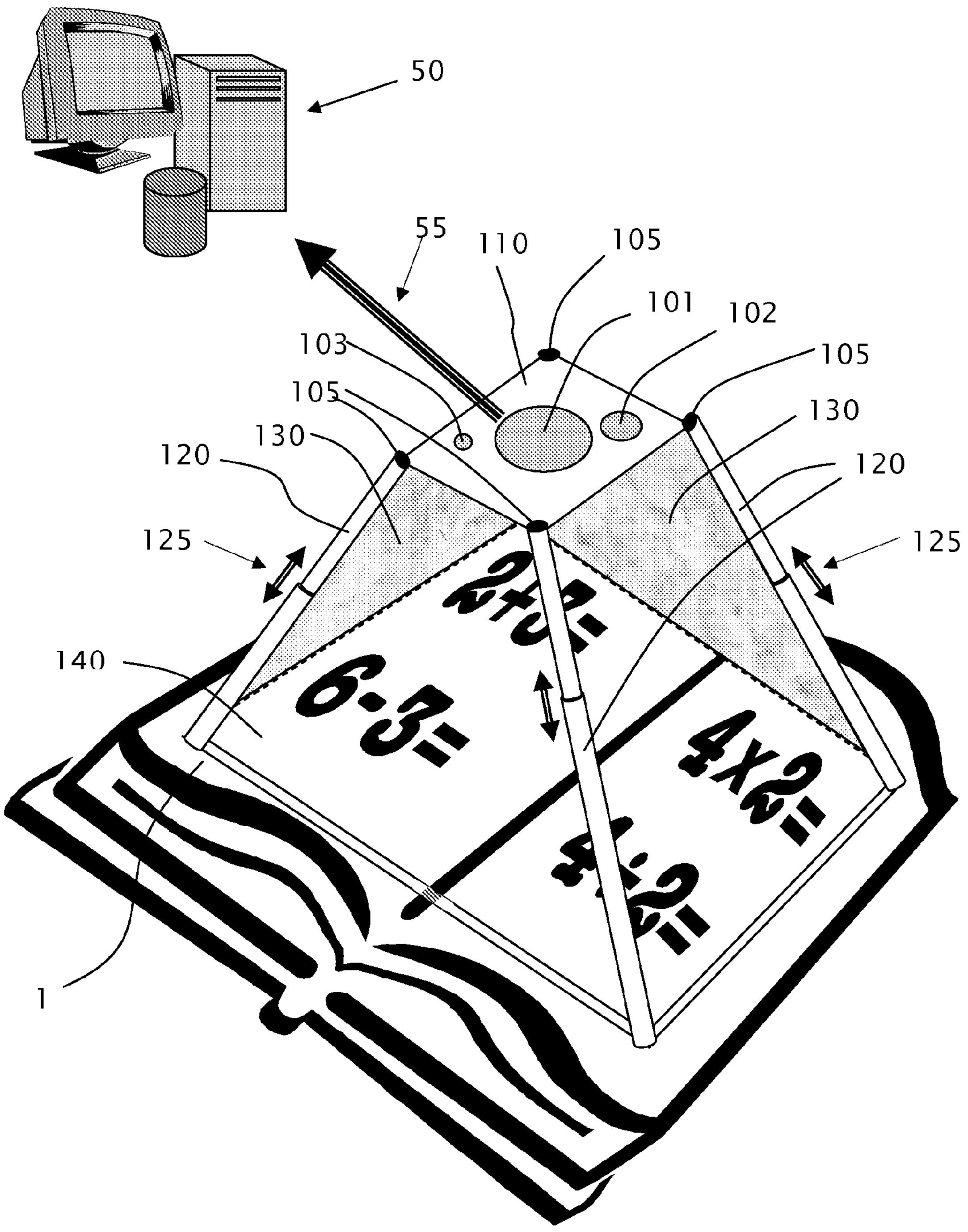
FIG. 1 depicts an example of the components of a system for extracting information from documents using a digital camera according to an embodiment of the present invention.

Before explaining at least one embodiment of the invention in detail, it is to be understood that the invention is not limited in its application to the details of construction and the arrangement of the components set forth in the following description or illustrated in the drawings.

The main object of the present invention is then to provide a personal, portable, adjustable and foldable document copier that can identify the presence of a new document such as a book, a page, a business card, an ID card, a passport and the like documents, adapt to its size, automatically synchronize with text line orientation—if present, take an image and transfer it to a coupled computer.

FIG. 1 illustrates the basic components of a system 100 for extracting information from documents according to an embodiment of the present invention, which comprise: a digital camera and processing unit 101 that reads and analyzes the document 1 to be copied, apparatus top and camera holder 110, 3 or more adjustable legs 120 optional opaque drapes 130 and an optional clear surface 140 made of glass, hard clear plastic or the like, hereinafter "glass surface".

Camera holder 110 further comprises a digital camera 101 facing down, at least one light source 102 and optionally, an indicator light 108 that indicates the status of the system 100 such as ready, busy etc. A document 1 such as a book 1 or any other type of document, including identity documents, is placed on a hard plane facing up. A transparent surface 140 may optionally be placed on top of said document 1.

Legs 120 enable the user to roughly adjust the distance of the camera 101 from document 1 and to roughly adjust to the document 1 shape, using various means such as, but not limited to, telescopic tubes motion 125, with universal axes 105 and the like. Opaque, flexible walls 130 may place around the legs 120, optionally extending from the document 1 surface and up the camera holder 110, to make the illumination more efficient.

The apparatus can communicate with a host processor 50 by any communication means 55 known in the art. The host processor 50 can be any data processing, such as a personal computer, laptop computer, PDA, or a palm computer using a communication link 55. Communication link 55 may use a standard serial or parallel protocol such as Universal Serial Bus (USB), RS232, fiber optical communication link, RF communication such as Bluetooth etc or any other communication means known in the art including wireless.

Optionally, the system 100 is equipped with a document sensor. The sensor is capable of sensing if a document is placed and information can be acquired. The sensor may be a micro-switch placed so the document activates it when fully placed. Alternatively, position of the document 1 such as identity card, may be sensed by a photoelectric detector, pressure sensor or a proximity sensor or any other sensor.

Optionally, the system 100 is equipped with Indicator light 108. For example, when the document sensor senses that it was placed, the indicator light 108 changes its status to alert the user that data acquisition may start.

For example, indicator light 108 may indicate one or more of the following system's 100 states: Ready for document insertion, document 1 is in position, data acquisition in progress, data processing in progress, remove the document 1, system error, etc. Optionally indicator light may be replaced with an LCD display, LED alphanumerical display or with audio indicator such as a buzzer or a speaker.

As a simple example, indicator light 108 in the form of a single green LED may turn on only when acquisition ends and succeed. After the document 1 is removed, the LED is turned off to indicate that the document 1 should be removed and the system 100 is ready for next document reading. Optionally, data acquisition may be activated by the document sensor. Alternately, the user may manually activate data acquisition.

Preferably, the camera 101 may acquire images at regular intervals, optionally using low image quality mode of operation. Image processing routine identifies the absence of a document 1 or improperly placed document 1 and rejects the images. When the image processing routine identifies that a document 1 is placed data acquisition is automatically activated. In this embodiment, indicator light will change appearance at the end of acquisition to signal the operator that he may remove the document 1. Optionally, the indicator light may also indicate the start of the data acquisition process signaling the user not to move the document 1 until data acquisition is completed.

Taking an image may take a fraction of a second to two second and even more, depending on the camera and light source. When several types of data (for example visible and at least one of IR UV and FL) are acquired, it is advantageous to keep the relative position between the several images, by keeping the document 1 stationary until data acquisition is completed.

Figure 2:
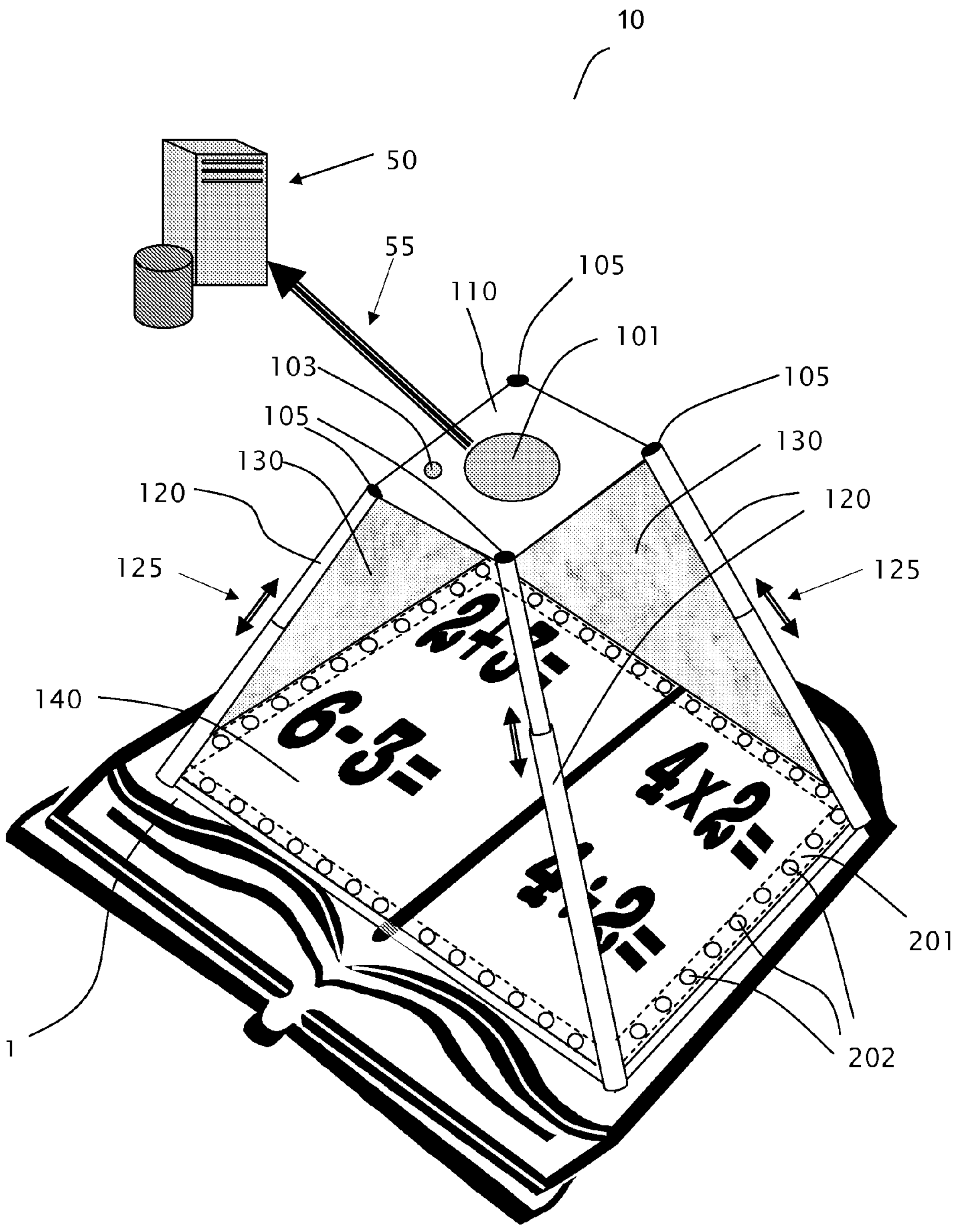
FIG. 2 depicts an example of the components of a system for extracting information from documents using a digital camera according to an embodiment of the present invention, including a uniform illumination mechanism.
Figure 3:
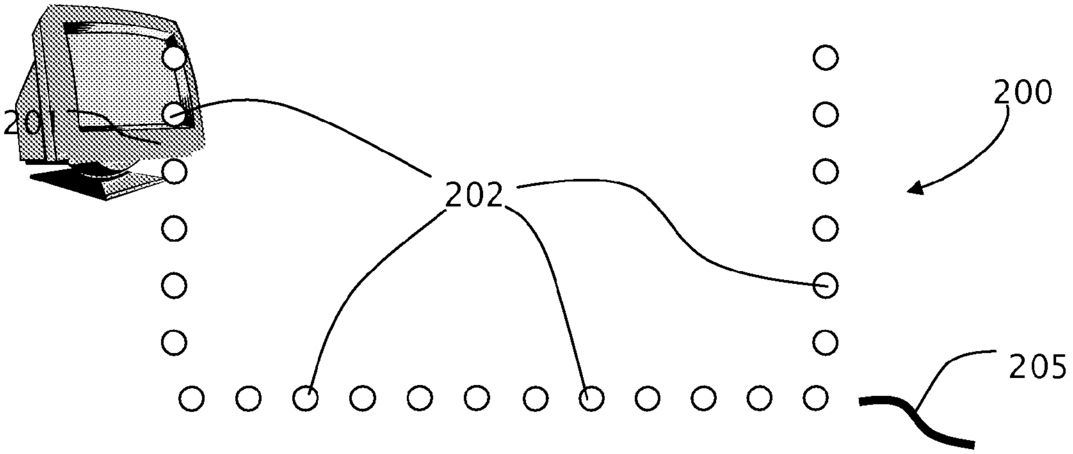
FIG. 3 depicts an example of a uniform illumination mechanism for a system for extracting information from documents using a digital camera according to an embodiment of the present invention.

FIG. 2 depicts an example of the components of a system 100 for extracting information from documents using a digital camera according to an embodiment of the present invention, including a uniform illumination mechanism 200. FIG. 3 shows, the uniform illumination mechanism 200, by way of example, comprising a frame 201, multiple light sources 202 and a power source 205.

Light sources 202 may comprise IR illumination, UV illumination, visible light illumination and other bands of wave length as required, to process colored documents, documents with special backgrounds such as water marks and any other visible and invisible printed materials used.

Light sources 202 may be any type of sources, but the system 100 of the present invention preferably uses LED light sources 202, including IR, UV and white, visible LEDs. In this embodiment, the light source should be placed outside the Field of View (FOV) of the camera 101, such it does not saturate it. The lights are aimed toward walls 130 such that the light beams bounce between the walls 130 and finally illuminate the document 1 with a substantially uniform illumination. It should be noted that walls 130 internal surface should also be outside the FOV of the camera 101.

Figure 4:
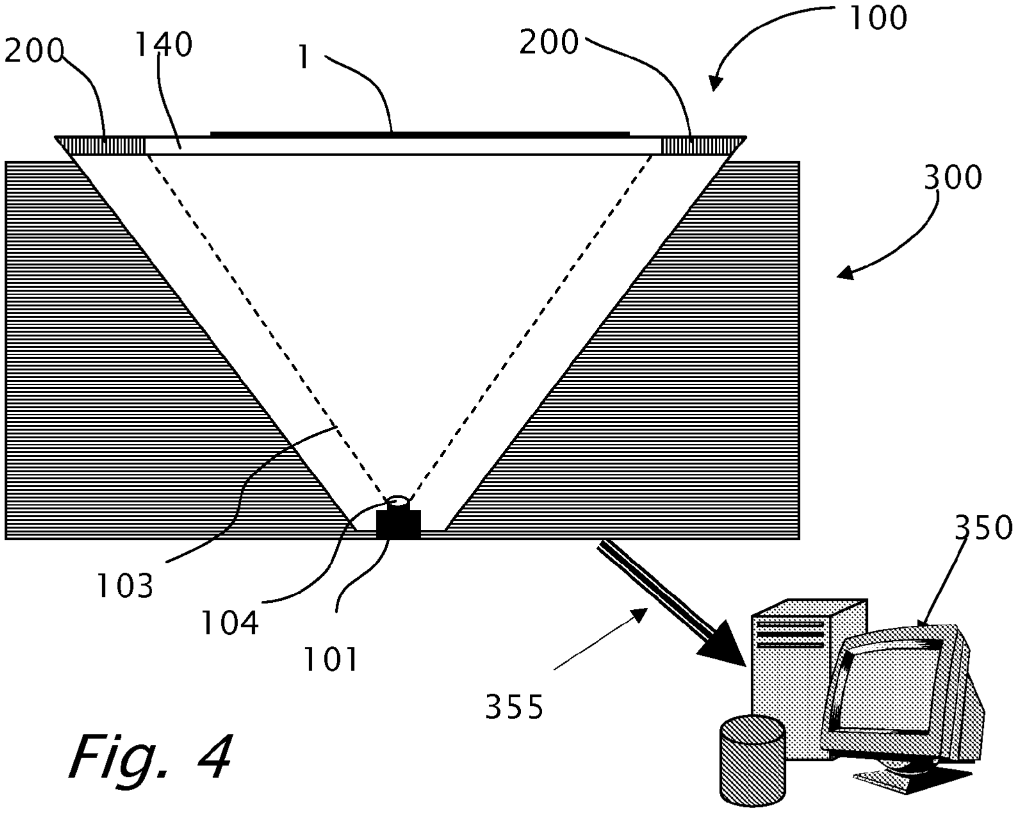
FIG. 4 depicts an example of the components of a system for extracting information from documents using a digital camera, placed on a docking apparatus, according to an embodiment of the present invention.

FIG. 4 depicts an example of the components of a system 100 for extracting information from documents using a digital camera 101, placed on a docking apparatus 300, according to an embodiment of the present invention. In this embodiment, the docking station 300 supplies the system 100 with a stable platform, communication means and power. In this example, a glass surface 140 is upside down and document 1 is placed on top of it. Illumination mechanism 200 is located outside the FOV 103 of the camera 101.

Figure 5:
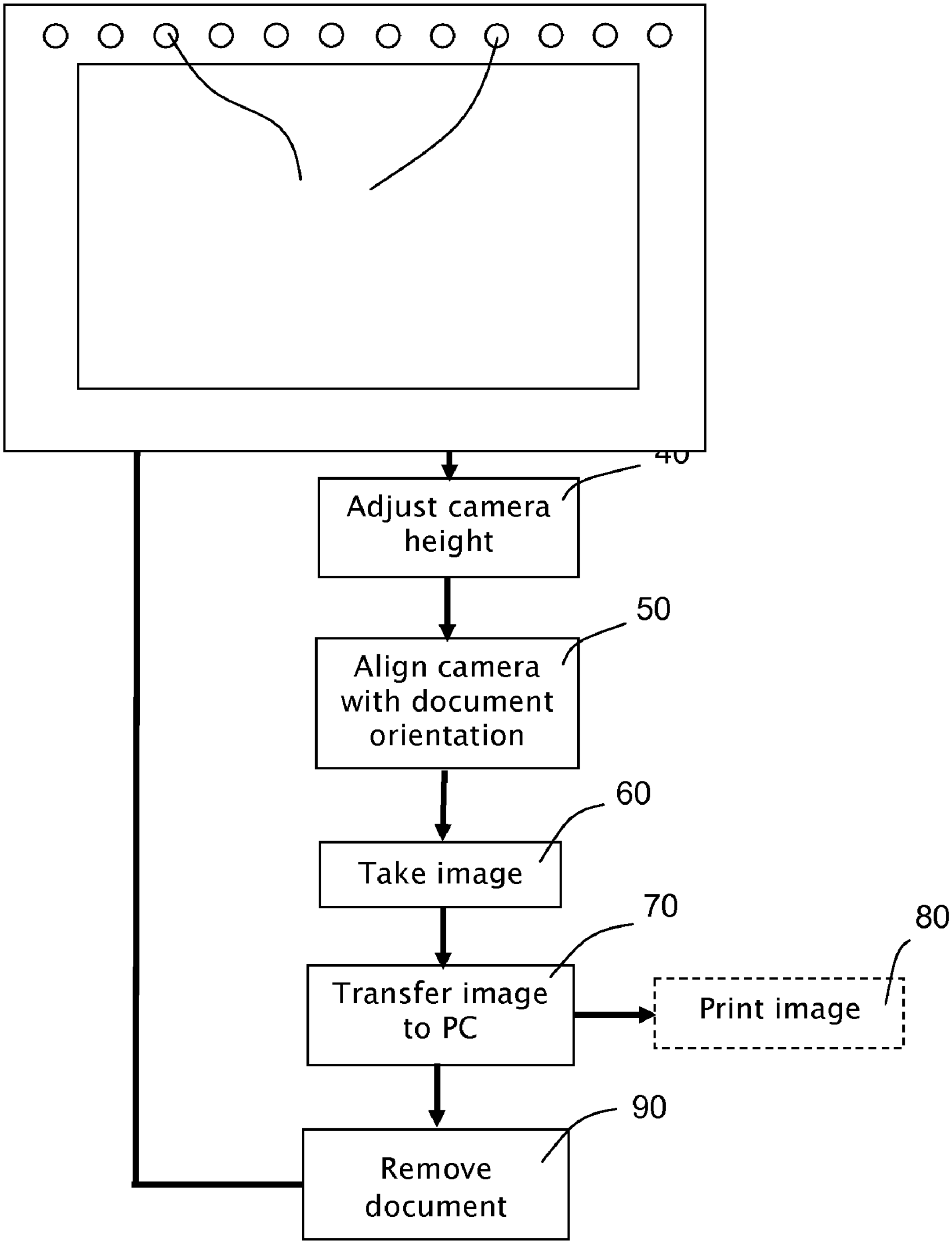
FIG. 5 is a schematic block diagram of a method of using a system for extracting information from documents using a digital camera according to an embodiment of the present invention.

FIG. 5 shows the schematic block diagram of a method of using the system 100 of the present invention. Initially, the apparatus is powered on 10, where its power is drawn from either a host computer 50, from batteries or any other power source. At this point the system 100 enters a "wait" state 20 and stays that way until a document 1 is introduced to it.

Scanning can be initiated by a sensor 30 or manually. Document 1 is either inserted beneath apparatus 100 or placed against a glass surface 140. Apparatus 100 can also be simply placed on top of document 1 or a glass surface 140 can be placed on top of document 1 and then apparatus 100 can be placed on top of it.

The camera 101 height is adjusted 40 and aligned 50 with the document 1 orientation using adjusting means such as telescopic tubes legs 120. once aligned and focused at least one image is taken by digital camera 101 and transferred 70 to a processor 50, which optionally processes the at least one image and can optionally print at least one image of the at least one images taken, extract desired data such as identification data, image data and any other relevant data.

When scanning is done the document 1 is removed and the system 100 of the present invention returns to its "wait" state 20, ready for another document 1 to be introduced to it.

Returning to FIG. 1, at least one light source 102 is housed on camera holder 110. Light source 102 is design to illuminate the document 1 to be acquired. Several light sources 102 may be used. Substantially even illumination of the document 1 may be achieved by use of several light source 103 optionally equipped with proper light reflector or light diffuser.

In one embodiment of the invention, the light source 102 produces substantially white light. In this embodiment, a color sensitive sensor array detects the light emitted from the source and reflected from the document. In another embodiment, color imaging is achieved by sequentially illuminating the document 1 with light of different colors.

Some documents 1 contain information not visible to human eye. The information may be hidden using infrared (IR), ultra-violet (UV) or florescent (FL) ink.

In an exemplary embodiment of the invention light source 102 emits light in the visible and invisible wavelength bands. The light source may be a single source such as a flashlight, fluorescent light, incandescent light or white light LED or a combination of few sources with different wavelength spectra.

Preferably, light emitting diodes (LED) are used as light source 102 for their low cost, small size, durability and low power consumption. Optionally a light source 102 is equipped with light diffuser to create uniform illumination of the document.

Camera 101 is equipped with an imaging lens 104 (FIG. 4) that focuses light from the document 1 onto the 2-D sensor array. The lens 104 may comprise a combination of few lenses or a combination of refracting and reflecting optical elements. Reflecting elements may be used to reduce the overall size of the system by folding the optical path. The lens 104 can be utilized to decrease the distance between the camera 101 and document 1. In addition, folding mirrors can be used to shorten said distance. The lens 104 can be fixed, where the adjustment of the proper distance between the lens 104 and the document 1 is done by adjusting mechanism 120. Optionally, the lens 104 can be moved along its optical axis, to adjust the focus.

Digital camera 101 comprises a two-dimensional solid-state light sensor array. 2-D pixelated light sensors are commercially available. Common array are Silicon based. For example, an array of photodiodes may be used. Light impinging of an array is converted to electric charge. CCD or CMOS technology is used to readout the charge accumulated in each pixel to an analog to digital converter (ADC).

The sensitivity spectra depend on the type of array used. For Silicon based arrays, the spectra spans from the near infrared (NIR) to the near ultraviolet (NUV). Some sensor array, such as used for TV cameras and digital still cameras are color sensitive. In these devices, Red Green and Blue (RGB) sensitive pixels are interspersed in the same array. Other color sensitive sensors uses optical filter to separate the light into wavelength bands and uses one sensor array for each color. Typically, the wavelength sensitivity of the red sensitive pixels extends into the NIR while the wavelength sensitivity of the blue sensitive pixels extends into the NUV.

Alternatively, a movable optical filter is placed in front of one 2-D array and wavelength bands are measured sequentially.

Color image of the document may be acquired by illuminating the document with white light and acquiring data by a color sensitive sensor array.

NIR reflectance image of the document may be acquired by illuminating the document with NIR light and acquiring data from the red sensitive pixels of a color sensitive sensor array.

NUV reflectance image of the document may be acquired by illuminating the document with NUV light and acquiring data from the blue sensitive pixels of a color sensitive sensor array.

Florescence image of the document may be acquired by illuminating the document with excitation light in UV, NUV or blue wavelength and acquiring data from the green and red sensitive pixels of a color sensitive sensor array. An optical filter designed to block the excitation wavelength may be used to protect the sensor.

In another embodiment of the present invention, the camera 101 consist more that one imaging sensors, for example, two sensors that have some minimal overlap between their simultaneously acquired images. This requires additional image processing to concatenate said two images. The advantage of such system is that it can cover more area while being positioned closer to the scanned document 1.

In some embodiments of the present invention, data processing unit is physically separated from camera unit holder 110. In this embodiment, communication link 55 is used to exchange commands and data between data processing unit 50 and electronic equipment associated with camera unit holder 110 such as camera 101, light source 102, indicating light 108 and card sensor electronics.

In another embodiment of the invention, data processing is integrated into the camera unit holder 110.

Due to physical limitations of the light source 102, the lens 104 and camera 101, the image acquired by the system may have to be pre-processed in order to extract the information on the document. Optionally, the image is pre-processes by data processing unit 50 to correct some of these imperfections.

For example, color balance may be applied to correct color sensitivity of the sensor array or spectra of the light source or both.

For example, image distortion and deformation caused by aberration and imperfection in the lens 104 may be corrected by distorting the image in the opposite way. A calibration image of a ruled card can be acquired in order to measure the distortion caused by the optical system.

Uneven illumination caused by imperfection in light spread from the light source may cause some parts of the image to be brighter or darker than the average brightness or to have different color balance. Similarly, deviation among pixels in the sensor array of sensitivity and dark signal may also cause variation in brightness. A calibration image of white or colored document 1 may be used to measure the distortion caused by these effects. Optionally, few images taken in different conditions are used to calculate a pixel sensitivity correction map to be applied to the image during pre-processing.

UV, IR or FL information is often printed on top of visible features on the document. In order to make this information easy to detect, proper subtraction of the information printed in visible ink may be applied.

Similarly, text printed on the document 1 may be printed on top of background of varying shade or on top of feature printed in other color. Optionally, known background is subtracted from the image during pre-processing.

Generally, the properties of the document 1 are known and data pre-processing may be optimized accordingly.

Information in the document 1 is extracted from the image. Optical Character Recognition (OCR) routine extracts alphanumerical information. By locating key features, the type of the document 1 may be known or determined. For example, if the document 1 is identified as a passport of a certain country, the location and meaning of textual information in the image may be predicted and used to assist the analysis.

Preferably, information extraction is done in stages: First, boundaries between text and background are determined based on minimum contrast between the character and other colored data on the document 1. Second, black and white glyphs are extracted using the data of boundaries. Third, OCR recognizes symbols and characters.

Information extracted from the document 1 may be sent to remote location using communication link such as Internet, phone, fax or cellular networks.

Authentication of a document 1 is optionally done by comparing features such as logo, color, fonts, and other characteristics of the documents 1 to database stored in data processing unit or in a remote database. Alternatively or additionally, authentication of a document 1 is done by comparing the extracted information to a database of records of valid or invalid documents.

Optionally, information extracted from document 1 is used to save the user the task of manually inputting the information. For example, at a hotel check-in the necessary information could be extracted from a driver license and a credit card.

Optionally, information extracted from document 1 is used for retrieving other information associated with the of the document holder. Optionally part of extracted information, for example name, family name or identity number is used as key words to perform a search for retrieving other information associated with the document holder such as credit history, etc. The search may be performed in databases stored locally in the processing unit, or in remote databases or both.

Optionally extracted information is used to augment database. For example, in a store or a hotel, a database of clients or visitors may be created and augmented so the owner of the system will be able to use it as a digital database for mailing advertisement or any other information.

Optionally several images of the same document 1 may be imaged, analyzed and the extracted data be stored as one record. For example, two sides of the same document 1 or several pages of a passport may be imaged sequentially.

Several light sources, light reflectors and light baffles may be used for more even illumination.

Although the present invention has been described with reference to the preferred embodiment and examples thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the following claims.

What is claimed is:

1. A system for extracting information from a document having a width dimension and a length dimension, the system comprising:

a) at least one digital camera comprising a lens and a two-dimensional sensor array for acquiring at least one two-dimensional image of said document;

b) an adjustable structure comprising:

i. three or more legs having a length, wherein each of said legs includes an adjusting means facilitating adjusting said length of said legs, and wherein each of said legs has a top end and a bottom end; and ii. a camera holder disposed at said top ends of said legs;

c) at least one light source for illuminating said document; and d) a processor for processing said at least one two-dimensional image and thereby extracting textual and image information from said document, wherein said digital camera is firmly attached to said camera holder, and wherein said lens of said digital camera faces said bottom ends of said legs;

wherein said document is operatively disposed proximal to said bottom ends of said legs; and wherein said legs facilitate adjustment of the distance of said digital camera from said document and thereby adapt to said width and length dimensions of said document.

2. A system as in claim 1, further comprising a docking station, wherein said docking station provides said system with power, stability platform and communication means to a remote processing unit.

3. A system as in claim 1, further comprising a communication link for operatively connecting said camera unit to said processor.

4. A system as in claim 1, wherein said digital camera comprises two or more sensors, wherein said two or more image sensors simultaneously acquire images, and wherein said processor concatenates said simultaneously acquired images.

5. A system as in claim 1, wherein said processor is remotely located.

6. A system as in claim 1, wherein said light source includes a light diffuser.

7. A system as in claim 6, wherein said light diffuser is a light reflector.

8. A system as in claim 7, wherein said light reflector includes a light baffle, wherein said light baffle prevents direct illumination of said document by said light source.

9. A system as in claim 1, wherein said adjustable structure further comprises a glass surface, wherein said glass surface is disposed at said bottom ends of said legs; wherein said glass surface is operatively placed over said document and thereby said glass surface flattens said document.

10. A system as in claim 1, wherein said legs facilitates folding of said adjustable structure into a portable document copier.

11. A system as in claim 1, wherein said legs are telescopic tubes.

12. A system as in claim 1, further comprising opaque flexible walls, wherein said opaque flexible walls wraparound said legs and extend substantially from said top ends of said legs down to said bottom ends of said legs, and wherein said opaque flexible walls is flexible to adapt to a set length of said legs.

13. A method for extracting textual and image information from a document having a width dimension and a length dimension, the method comprising the steps of:

a) providing at least one digital camera comprising a lens and a two-dimensional sensor array for acquiring at least one two-dimensional image of said document, wherein said at least one digital camera operatively acquires at least one image of said document;

b) providing an adjustable structure including:

i. three or more legs having a length, wherein each of said legs includes an adjusting means facilitating adjusting said length of said legs, wherein each of said legs has a top end and a bottom end, and wherein said document is operatively disposed proximal to said bottom ends of said legs: and ii. a camera holder disposed at said top ends of said legs, wherein said digital camera is firmly attached to said camera holder, and wherein said lens of said digital camera faces said bottom ends of said legs:

c) adjusting said adjustable structure to set the distance of said lens from said document such that the field of view of said lens fits said width dimension and said length dimension of said document:

d) determining boundaries between text and background based on minimum contrast between a character and other colored data on said document;

e) extracting black and white glyphs using the data of said boundaries; and f) performing OCR on said black and white glyphs, thereby recognizing symbols and characters.

14. A method as in claim 13, wherein said image acquisition is automatically initiated by sensing proper placement of said document.

15. A method as in claim 14, wherein said sensing of proper placement of said document is performed using a sensor.

16. A method as in claim 14, wherein said sensing of proper placement of said document is facilitated by at least a partial image analysis of said at least one acquired image.

17. A method as in claim 16, wherein said at least one acquired image is of lower quality than images used for said extracting of said textual and image information.

* * * * *